W. H. GAITHER.
APPARATUS FOR PURIFYING AIR.
APPLICATION FILED MAR. 6, 1915.
1,170,526.
Patented Feb. 8, 1916.
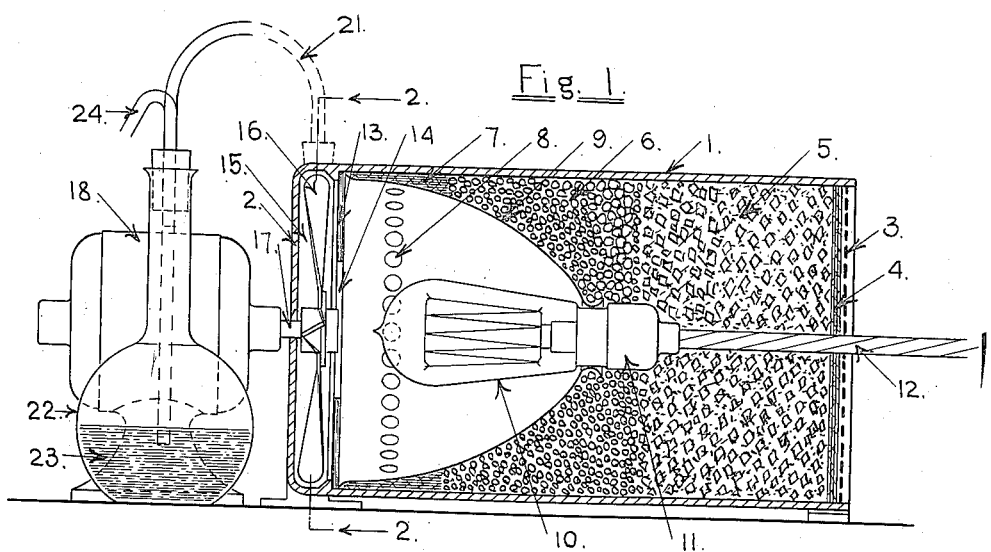
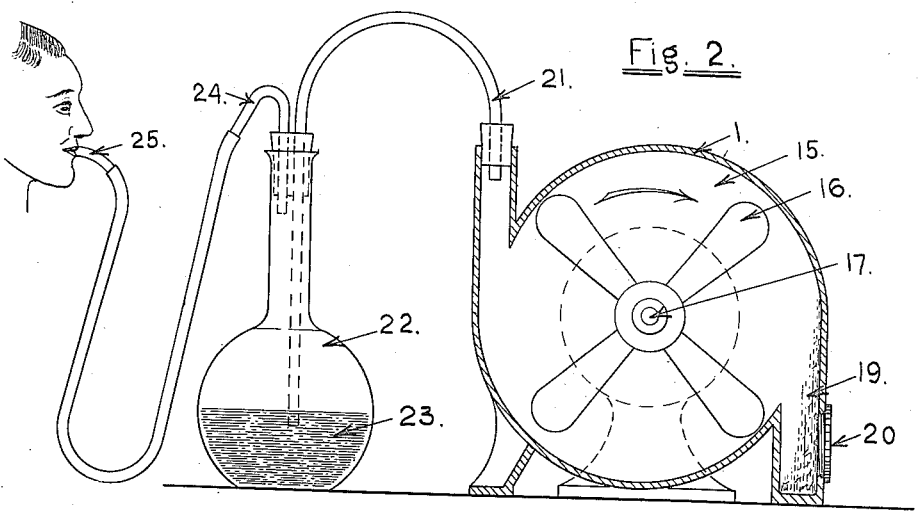
WITNESSES:
Elbert L. Hyde
Glenn H. Leresche
INVENTOR.
Wallace H. Gaither
BY Fredk. W. Winter
ATTORNEY.

UNITED STATES PATENT OFFICE.

WALLACE H. GAITHER, OF PITTSBURGH, PENNSYLVANIA.

APPARATUS FOR PURIFYING AIR.

1,170,526.

Specification of Letters Patent.

Patented Feb. 8, 1916.

Application filed March 6, 1915. Serial No. 12,561.

*To all whom it may concern:*

Be it known that I, WALLACE H. GAITHER, a resident of Pittsburgh, in the county of Allegheny and State of Pennsylvania, have invented a new and useful Improvement in Apparatus for Purifying Air, of which the following is a specification.

This invention relates to method and apparatus for purifying air.

The object of the invention is to provide apparatus whereby atmospheric air may be purified both chemically and mechanically to produce a pure air having any desired properties, that is, any desired or required amount of moisture, and also medicated or otherwise treated so as to improve the physical condition of the patient and thereby restore his health and vitality.

The invention comprises apparatus hereinafter described and claimed.

In the drawings, Figure 1 represents a longitudinal sectional elevation through apparatus embodying the invention; and Fig. 2 is a sectional view on the line 2—2, Fig. 1.

The method involves chemical, mechanical and electrical steps. In other words, the air is treated mechanically to remove impurities, chemically for the purpose of removing carbon dioxid and moisture, and medicating and correctly humidifying it, and electrically for the destruction of germs and organic matter. Briefly stated, it consists in filtering the air to remove coarse solid particles of dust and dirt, passing it through a suitable material for removing carbon dixoid, then through a drying agent to dehydrate it, then subjecting it to the action of a high speed centrifugal separator to remove the finer solid particles of dust and dirt, treating it with actinic or chemical light rays produced. electrically to destroy germs and organic matter, and then treating it chemically to produce the proper or required degree of humidity and to also medicate it or impregnate it with various suitable substances, according to the requirements of the particular case. These several steps are not all essential and the method may be carried out in various ways and without utilizing all of said steps. Moreover, their exact order or sequence is not essential and will depend upon the particular case and sometimes upon the arrangement of the particular apparatus employed.

The apparatus shown in the drawings comprises a suitable shell or casing 1, which may be made of any suitable material, such as aluminum or the like, said shell being shown as a hollow cylinder with one end closed by a head or cap 2. Its opposite end is open but is covered by a metallic protecting screen 3 which supports the materials within the casing and prevents them from falling out. Behind said screen are located one or more porous filtering diaphragms 4 for filtering out the coarse particles of dust, dirt and other solid matter. These diaphragms may be made, for example, of cotton duck sheeting or any other suitable material. Next in order in the casing is a charge 5 of some substance which readily absorbs carbon dioxid. A suitable substance for this purpose is charcoal of fine porous texture, preferably in coarse fragments, to enable the air to readily pass therethrough without offering too much resistance and thereby impeding or retarding the air flow. The moisture in the air is removed by a suitable drying agent, for which many materials are suitable. I have found a good substance for this purpose is solid calcium chlorid, which is packed into the casing next to the charcoal 5, as shown at 6. Beyond the calcium chlorid is a packing or stuffing 7 of cotton batting or similar material which filters out some fine solid material and also protects the openings 8 in a reflector 9 and prevents the solid in the casing from falling through said openings.

The reflector 9 may be of any suitable form but preferably has its inner surface highly polished or otherwise so formed as to reflect forwardly all of the actinic or chemical light rays produced by a source of light or lamp 10, which may for example be a mercury-vapor or tungsten lamp or a suitable high tension spark gap. The drawings illustrate a tungsten lamp, the base 11 of which forms a support for the small end of the reflector 9 and the lead wires 12 of which pass through the open end of the casing 1 and through the solid materials therein. At the large end of the reflector 9 is located a transverse wall or diaphragm 13, preferably formed of some transparent material, such as glass, and having a central opening 14 through which the air passes from the chamber within the reflector to a cyclonic chamber 15 lying between said diaphragm and the end cap or head 2. The inner surface of the end cap 2 is also a reflecting surface, so that the air within the reflector and in the chamber 15 is under the influence of the actinic or chemical light rays produced by the lamp 10. These rays destroy germs and organic matter and thereby improve its quality and destroy some of its otherwise harmful properties.

Within the cyclonic chamber 15 is located a centrifugal separating device, shown as a centrifugal fan 16, the blades of which are mounted on a shaft 17 passing through the center of the end wall or cap 2 and driven by a suitable driving device, such as the electric motor 18. Said motor rotates at a very high speed, say 5000 revolutions per minute, so that the air in the chamber 15 is whirled around at very high speed and the tremendous centrifugal force thereby generated throws the remaining very fine solid particles of dust and dirt in the air to the walls of the casing, from which they are discharged into a trap or well 19 at one side of the chamber 15, said well being provided with a removable cap 20 so that the collected material may be removed whenever desired. The whirling of the air in the chamber 15 also thoroughly blends the component parts of the air. The fan 16 rotates at such a high speed that most of the air in the chamber 15 is not discharged immediately therefrom, but is whirled around very rapidly with a cyclonic action. A small part of the air, however, passes out from the chamber 15 through a conduit 21 and the fan produces a light suction on one side and pressure on the other of, say, one ounce or less per square inch. The conduit 21 leads to a suitable device for treating the air chemically, such as the wash bottle 22. Said wash bottle may contain any material with which it is desired to impregnate the air, such as the liquid shown at 23, and in which the lower end of the pipe 21 is immersed. By using distilled water in the wash bottle 22 and properly adjusting the depth of penetration of the pipe 21 thereinto, the air may be humidified or impregnated with moisture to any desired degree. This will imitate plain or desert air. By changing said bottle with a saline solution the properties of sea air are approached, or if essential oils or other similar substances are used the deep forest or meadow effects are secured. The wash bottle is provided with an air discharge tube 24 and mouthpiece 25, so that the air is inhaled by the patient into the mouth and lungs and is discharged from the nose, making a continuous closed circuit without the usual opportunity for pollution, as when a face mask is used and a part of the air just exhaled is reinhaled. Also, the light pressure produced by the fan 16 is applied directly to the mouth and relieves the patient of much of the labor of dilating his lungs and increases the volume of his intake. To a limited extent it also assists in forcing the air to the farthermost recesses of the lungs.

This apparatus is intended to be used by physicians for treating patients, or by the patient in his home. It is used at convenient frequent intervals and each treatment may extend over any desired period of time. It is found in practice that daily treatments of half an hour or so over a period of a few weeks or months greatly improve the health and vigor of the patient, especially in cases of enervation or mental or nervous depression. The oxygen content of the air is not disturbed either chemically or in its proportion to the nitrogen therein, but the air is merely freed of deleterious matter and is delivered to the patient with the proper amount of moisture and correctly medicated to suit his own special requirements.

What I claim is:—

1. Apparatus for purifying air, comprising a casing provided at one end with a cyclonic chamber and open at its opposite end, a filtering screen at the open end of said casing, means within said casing for absorbing carbon dioxid and moisture, and a high speed centrifugal separator in said cyclonic chamber for removing the finer dust particles.

2. Apparatus for purifying air, comprising a casing provided at one end with a cyclonic chamber and open at its opposite end, a filtering screen at the open end of said casing, means within said casing for absorbing carbon dioxid and moisture, a high speed centrifugal separator in said cyclonic chamber for removing the finer dust particles, and a trap or well at one side of said cyclonic chamber for collecting the finer dust particles.

3. Apparatus for purifying air, comprising a hollow casing closed at one end and open at the other, a reflector within said casing, an electric lamp within said reflector, and a centrifugal separator at the open end of said reflector.

4. Apparatus for purifying air, comprising a hollow casing closed at one end and open at the other, a reflector within said casing, an electric lamp within said reflector, a centrifugal separator at the open end of said reflector, and a transparent diaphragm between said lamp and separator and provided with a central opening therein.

5. Apparatus for purifying air, comprising a hollow casing closed at one end and open at the other, a reflector within said casing, an electric lamp within said reflector, a centrifugal separator at the open end of said reflector, and a transparent diaphragm between said chamber and separator and provided with a central opening therein, said casing containing means for absorbing carbon dioxid and moisture and also provided with mechanical filtering means.

6. Apparatus for purifying air, comprising a casing provided at one end with a cyclonic chamber, a centrifugal separator within said chamber, a filtering screen at the other end of said chamber, means within said casing for absorbing carbon dioxid and moisture, an electric lamp within said casing, and means connected to said cyclonic chamber for impregnating the air with moisture and other chemical substances.

In testimony whereof, I have hereunto set my hand.

WALLACE H. GAITHER.

Witnesses:
ELBERT L. HYDE,
WILLIAM B. WHARTON.